United States Patent
Coulson

(10) Patent No.: US 7,275,135 B2
(45) Date of Patent: Sep. 25, 2007

(54) HARDWARE UPDATED METADATA FOR NON-VOLATILE MASS STORAGE CACHE

(75) Inventor: Richard L. Coulson, Portland, OR (US)

(73) Assignee: Intel Corporation, Santa Clara, CA (US)

(*) Notice: Subject to any disclaimer, the term of this patent is extended or adjusted under 35 U.S.C. 154(b) by 661 days.

(21) Appl. No.: 09/945,266

(22) Filed: Aug. 31, 2001

(65) Prior Publication Data

US 2003/0046493 A1   Mar. 6, 2003

(51) Int. Cl.
*G06F 12/00* (2006.01)
(52) U.S. Cl. .................................. 711/143; 711/160
(58) Field of Classification Search ............... 711/118, 711/154, 156, 160, 166, 167, 143
See application file for complete search history.

(56) References Cited

U.S. PATENT DOCUMENTS

| | | | |
|---|---|---|---|
| 3,353,430 A | 11/1967 | Brackman et al. | |
| 4,430,712 A | 2/1984 | Coulson et al. | |
| 4,468,730 A | 8/1984 | Dodd et al. | |
| 4,503,501 A | 3/1985 | Coulson et al. | |
| 4,513,392 A * | 4/1985 | Shenk | 711/110 |
| 4,536,836 A | 8/1985 | Dodd et al. | |
| 4,908,793 A | 3/1990 | Yamagata et al. | |
| 4,972,364 A | 11/1990 | Barrett et al. | |
| 5,046,043 A | 9/1991 | Miller et al. | |
| 5,070,314 A | 12/1991 | Decker | |
| 5,133,060 A | 7/1992 | Weber et al. | |
| 5,197,895 A | 3/1993 | Stupecky | |
| 5,269,019 A | 12/1993 | Peterson et al. | |
| 5,274,799 A | 12/1993 | Brant et al. | |
| 5,347,428 A | 9/1994 | Carson et al. | |
| 5,353,430 A | 10/1994 | Lautzenheiser | |
| 5,386,546 A * | 1/1995 | Hamaguchi | 711/133 |
| 5,442,752 A | 8/1995 | Styczinski | |
| 5,444,651 A * | 8/1995 | Yamamoto et al. | 365/108 |
| 5,466,629 A | 11/1995 | Mihara et al. | |
| 5,499,337 A | 3/1996 | Gordon | |
| 5,519,831 A | 5/1996 | Holzhammer | |
| 5,526,482 A | 6/1996 | Stallmo et al. | |
| 5,542,066 A | 7/1996 | Mattson et al. | |

(Continued)

FOREIGN PATENT DOCUMENTS

EP   0210384 B1   2/1987

(Continued)

OTHER PUBLICATIONS

Pending, Royer et al., U.S. Appl. No. 09/895,578, filed Jun. 29, 2001.

(Continued)

*Primary Examiner*—Woo H. Choi
(74) *Attorney, Agent, or Firm*—Trop, Pruner & Hu, P.C.

(57) ABSTRACT

An apparatus and method to de-allocate data in a cache memory is disclosed. Using a clock that has a predetermined number of periods, the invention provides a usage timeframe information to approximate the usage information. The de-allocation decisions can then be made based on the usage timeframe information.

14 Claims, 3 Drawing Sheets

U.S. PATENT DOCUMENTS

| | | | |
|---|---|---|---|
| 5,586,291 | A | 12/1996 | Lasker et al. |
| 5,604,881 | A | 2/1997 | Thomas |
| 5,606,706 | A * | 2/1997 | Takamoto et al. .......... 711/100 |
| 5,615,353 | A | 3/1997 | Lautzenheiser |
| 5,619,675 | A * | 4/1997 | De Martine et al. ........ 711/133 |
| 5,636,355 | A | 6/1997 | Ramakrishnan et al. |
| 5,701,516 | A | 12/1997 | Cheng et al. |
| 5,761,678 | A | 6/1998 | Bendert et al. |
| 5,764,945 | A | 6/1998 | Ballard |
| 5,787,296 | A | 7/1998 | Grimsrud et al. |
| 5,787,466 | A | 7/1998 | Berliner |
| 5,806,085 | A | 9/1998 | Berliner |
| 5,809,337 | A | 9/1998 | Hannah et al. |
| 5,845,313 | A | 12/1998 | Estakhri et al. |
| 5,860,083 | A | 1/1999 | Sukegawa |
| 5,890,205 | A | 3/1999 | Grimsrud et al. |
| 5,913,224 | A | 6/1999 | MacDonald |
| 5,918,244 | A | 6/1999 | Percival |
| 5,963,721 | A | 10/1999 | Shiell et al. |
| 5,974,508 | A | 10/1999 | Maheshwari |
| 6,012,140 | A | 1/2000 | Thomason |
| 6,023,713 | A | 2/2000 | Grimsrud et al. |
| 6,025,618 | A | 2/2000 | Chen |
| 6,052,789 | A | 4/2000 | Lin |
| 6,055,180 | A | 4/2000 | Gudesen et al. |
| 6,064,615 | A | 5/2000 | Gudesen |
| 6,072,490 | A | 6/2000 | Bates et al. |
| 6,081,883 | A | 6/2000 | Popelka et al. |
| 6,101,574 | A | 8/2000 | Kumasawa et al. |
| 6,105,111 | A | 8/2000 | Hammarlund et al. |
| 6,119,118 | A | 9/2000 | Kain, III et al. |
| 6,122,711 | A | 9/2000 | Mackenthun et al. |
| 6,157,981 | A * | 12/2000 | Blaner et al. .................. 711/3 |
| 6,165,006 | A | 12/2000 | Yeh et al. |
| 6,175,160 | B1 | 1/2001 | Paniccia et al. |
| 6,178,479 | B1 | 1/2001 | Vishin |
| 6,209,062 | B1 | 3/2001 | Boland et al. |
| 6,236,586 | B1 * | 5/2001 | Morisaki ...................... 365/74 |
| 6,240,416 | B1 | 5/2001 | Immon et al. |
| 6,263,405 | B1 | 7/2001 | Irie et al. |
| 6,285,626 | B2 * | 9/2001 | Mizuno et al. ............. 365/233 |
| 6,295,538 | B1 | 9/2001 | Cooper et al. |
| 6,295,577 | B1 | 9/2001 | Anderson et al. |
| 6,298,130 | B1 | 10/2001 | Galvin |
| 6,308,168 | B1 | 10/2001 | Dovich et al. |
| 6,370,614 | B1 | 4/2002 | Teoman et al. |
| 6,385,697 | B1 | 5/2002 | Miyazaki |
| 6,389,505 | B1 * | 5/2002 | Emma et al. ................ 711/106 |
| 6,438,647 | B1 | 8/2002 | Nielson et al. |
| 6,498,744 | B2 | 12/2002 | Gudesen et al. |
| 6,502,174 | B1 * | 12/2002 | Beardsley et al. .......... 711/170 |
| 6,539,456 | B2 | 3/2003 | Stewart |
| 6,564,286 | B2 | 5/2003 | DaCosta |
| 6,662,267 | B2 | 12/2003 | Stewart |
| 6,670,659 | B1 | 12/2003 | Gudesen et al. |
| 6,725,342 | B1 * | 4/2004 | Coulson ...................... 711/141 |
| 6,785,767 | B2 | 8/2004 | Coulson |
| 6,829,682 | B2 * | 12/2004 | Kirihata et al. ............. 711/143 |
| 6,839,812 | B2 | 1/2005 | Royer, Jr. et al. |
| 6,920,533 | B2 | 7/2005 | Coulson et al. |
| 6,941,423 | B2 | 9/2005 | Coulson |
| 2002/0083264 | A1 | 6/2002 | Coulson |
| 2002/0160116 | A1 | 10/2002 | Nordal et al. |
| 2002/0199152 | A1 * | 12/2002 | Garney et al. .............. 714/765 |
| 2003/0001176 | A1 * | 1/2003 | Li et al. ...................... 257/295 |
| 2003/0005219 | A1 | 1/2003 | Royer, Jr. et al. |
| 2003/0005223 | A1 | 1/2003 | Coulson et al. |
| 2003/0005233 | A1 * | 1/2003 | Stewart et al. .............. 711/136 |
| 2003/0023922 | A1 * | 1/2003 | Davis et al. ................. 714/763 |
| 2003/0046487 | A1 * | 3/2003 | Swaminathan .............. 711/106 |
| 2003/0061436 | A1 | 3/2003 | Royer, Jr. et al. |
| 2003/0074524 | A1 | 4/2003 | Coulson |
| 2003/0084239 | A1 | 5/2003 | Stewart |
| 2003/0120868 | A1 | 6/2003 | Royer, Jr. et al. |
| 2003/0188123 | A1 | 10/2003 | Royer, Jr. et al. |
| 2003/0188251 | A1 | 10/2003 | Brown et al. |
| 2004/0088481 | A1 | 5/2004 | Garney |
| 2004/0162950 | A1 | 8/2004 | Coulson |
| 2004/0225826 | A1 | 11/2004 | Royer, Jr. et al. |
| 2004/0225835 | A1 | 11/2004 | Coulson |

FOREIGN PATENT DOCUMENTS

| | | |
|---|---|---|
| EP | 0702305 A1 | 3/1996 |
| GB | 2210480 A | 6/1989 |
| JP | 06236241 | 8/1994 |
| WO | WO93/21579 | 10/1993 |
| WO | WO 02/01364 A2 | 1/2002 |
| WO | WO 02/01364 A3 | 1/2002 |
| WO | WO 02/01365 A2 | 1/2002 |
| WO | WO 02/01365 A3 | 1/2002 |
| WO | WO 03/003202 A1 | 1/2003 |
| WO | WO 03/003217 A2 | 1/2003 |
| WO | WO 03/003217 A3 | 1/2003 |
| WO | WO 03/034230 A1 | 4/2003 |

OTHER PUBLICATIONS

Pending, Coulson et al., U.S. Appl. No. 09/894,310, filed Jun. 27, 2001.

Pending, Royer et al., U.S. Appl. No. 10/026,398, filed Dec. 21, 2001.

Coulson—U.S. Appl. No. 09/602,008 "In-Line Cache".

Coulson—U.S. Appl. No. 09/602,009 "Non-Volatile Cache Expansion Board".

Coulson—U.S. Appl. No. 09/602,010 "Non-Volatile Cache".

Coulson—U.S. Appl. No. 09/602,011 "Non-Volatile Cache Integrated With Mass Storage Device".

Coulson—U.S. Appl. No. 10/740,633 "Non-Volatile Mass Storage Cache Coherency Apparatus Administrator".

Auciello et al—The Physics of Ferroelectric Memories, Physics Today, Jul. 1998, pp. 22-27.

SGS Thomson—GSF32-16×16/90 32 MByte SIMM Glash Memory Module 4 pages.

Derwent—Document ID RD 431135 A—A raid controller with a removable NVRAM cache on detecting a battery or an NVRAM fault automatically flushes all . . . 3 pages.

Derowitsch—Smart Computing—"The Quiet Role of Chipsets" Aug. 1998, vol. 9, Issue 8.

Diefendorff—Intel Tries Integrating Graphics—In-Star MDR Aug. 24, 1998.

DPT—Smart IV PM2144W PCI High Performance SCSI Adapter.

DPT—News Release—DPT's SmartCache IV RAID/Caching Kits Outperform Adaptec's SCSI Adapters in Independent Tests and Reviews—Aug. 1, 1996.

Hodges et al—1983, pp. 388-389—Analysis and Design of Digital Integrated Cicuits.

Intel—Jun. 1997—Intel 430HX PCIset Design Guide pp. 1-1 thru 6-15.

Intel—Apr. 1997—82371FB (PIIX) and 82371SB (PIIX3) PCI ISA IDE Xcelerator.

IRE Transactions—Component Parts—Switching the Memory Matrix.

Merz—Sep. 1955—Ferroelectric Storage Devices pp. 335-342.

Microsoft Press—Computer Dictionary 2nd Ed. 1994—Nondestructive readout, p. 270.

Moazzami et al—Oct. 1990, vol. 11, Issue 10 Citation and Abstract IEEE/IEE Electronic Library—A ferroelectic DRAM cell for high-density NVRAMs.

Mueller—2002—Upgrading and Repairing PCS—pp. 363-366 Chapter 9—Chipset Evolution.

NTIS—Dept of Navy—Jan. 14, 1974—Multi-Wire Cable to Coaxial Cable Transition Apparatus—ADD000450, 8 pages.

IBM Technical Disclosure Bulletin, Jul. 1982—Optical/Magnetic Storage Disk System, vol. 25, Issue 2 pp. 459-460.

Pulvari—Mar. 1956, pp. 3-11—Ferroelectrics and their Memory Applications.
Ramtron Dec. 7, 1999—FM24C64 64Kb FRAM Serial Memory—15 pages.
Ramtron Dec. 7, 1999—FM1608 64Kb Brtewide FRAM Memory—12 pages.
Ramtron Jan. 1994—FRAM Technology—2 pages.
Robertson—Sep. 3, 1998—Hyundai enters Japanese-dominated FeRAM market—2 pages.
Rosenberg—1987—Dictionary of Computers, Information Processing & Telecommunications, 2nd Ed.—p. 221.
Sun Microsystems—White Paper—Jun. 29, 1999—Sun StorEdge A5200 Fibre Channel Array and Sun Enterprise 10000 Server Set New Milestones for I/O Speed and performance.
Tanzawa—May 1, 1997 IEEE Journal of Solid State Circuits, IEEE—vol. 32, No. 5, pp. 662-668—A Compact On-Chip ECC for Low Cost Flash Memories.
Webster's 9th New Collegiate Dictionary 1986 p. 733—entry for matrix.

White 1993 pp. 71-73—How Computers Work, Chapter 11—How a Disk Cache Works.
Ramtron, "Replacing a Dallas Semiconductor DS1225 with FRAM Memory", Application Note, Ramtron International Corporation, Colorado Springs, Colorado, pp. 1-2 (Feb. 1994).
Date, M., et al., "Opto-Ferroelectric Memories Using Vinylidene Fluorode Copolymers", IEEE, pp. 298-302 (1988).
Lang, Sidney B., et al., "Pyroelectric Applications of Ferroelectric Polymers", IEEE, pp. 251-255 (1988).
IBM Technical Disclosure Bulletin, "Non-Volatile Cache Storage Allocation Algorithm", vol. 38, No. 12, pp. 39-41 (Dec. 1995).
IBM Technical Disclosure Bulletin, "Ultrafast Nonvolatile Ferroelectric Information Storage Device", vol. 37, No. 11, pp. 421-424 (Nov. 1, 1994).

* cited by examiner

HARDWARE UPDATED METADATA FOR NON-VOLATILE MASS STORAGE CACHE

FIELD

The present invention relates in general to cache memories, and in particular, to a method and apparatus for providing a mass storage cache management.

GENERAL BACKGROUND

The use of a cache with a processor reduces memory access time and increases the overall speed of a device. Typically, a cache is an area of memory which serves as a temporary storage area for a device. Data frequently accessed by the processor remain in the cache after an initial access and subsequent accesses to the same data may be made to the cache.

When the processor refers to a memory and finds the data in the cache, it is said to produce a hit. Otherwise, when the data is not in the cache but in the memory, a miss occurs. If a miss occurs, an allocation may be made to place the data into the cache for later accesses. Here, an access can be for loading data to the processor or for storing data from the processor to a memory. The cached information is retained by the cache until it is no longer needed, made invalid or replaced by other data, in which instances the cache entry is de-allocated.

In particular, for mass storage devices, the size of a memory is significantly larger than the amount of space available in a cache so that the cache eventually becomes full. When the cache is full, it is necessary to replace or de-allocate existing lines of stored data in the cache memory to make room for newly requested lines of data.

BRIEF DESCRIPTION OF THE DRAWINGS

The invention will be described in detail with reference to the following drawings in which like reference numerals refer to like elements wherein.

DETAILED DESCRIPTION

In the following description, specific details are given to provide a thorough understanding of the invention. For example, some circuits are shown in block diagram in order not to obscure the present invention in unnecessary detail. However, it will be appreciated by those skilled in the art that the present invention may be practiced without such specific details.

As disclosed herein, a "cache" refers to a temporary storage area and can be any combination of a volatile storage such as a random access memory (RAM) and a nonvolatile storage. The term "machine readable medium" includes, but is not limited to portable or fixed storage devices, optical storage devices, and any other devices capable of storing instructions and/or data. The term "instructions" refers to a single instruction or a group of instructions, and may be one or a combination of software and firmware including data, codes, and programs that can be read and/or executed to perform certain tasks.

One embodiment of the invention provides an apparatus and method to manage cache memories. For example, two pieces of metadata for mass storage caches are typically used to decide what to de-allocate/replace in a cache when the cache is considered full. The first is a count of the number of hits to a cache line and the second is an indication of the last time the cache line was accessed, for example the least recently used (LRU) information. When the cache is accessed, the metadata should be accurately updated for use in the de-allocation/replacement decisions.

Also, in one embodiment, a clock with a given number of periods is used to approximate usage information, such as the LRU information, for a cache. Generally, a current clock period is checked when a cache is accessed and a usage bit corresponding to the current clock period is set to indicate the usage information for the cache. Based on the usage information, de-allocation or replacement decisions are made to remove data from the cache when the cache storage becomes too large or is considered full, for example, nearly full or full. When available, a "writeback" cycle is used in updating the metadata.

Figure 1:
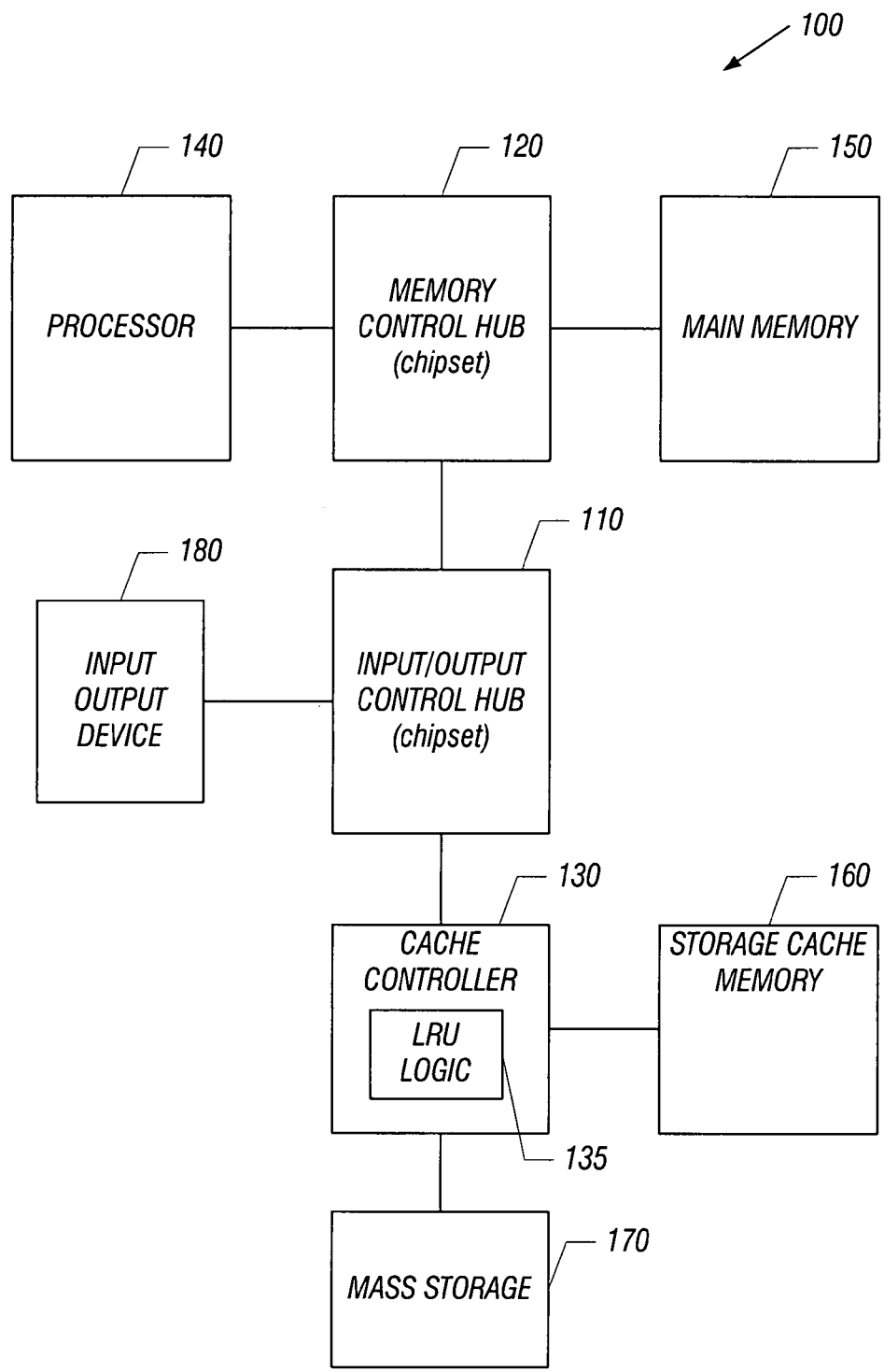
FIG. 1 shows an exemplary system implementing the invention.

An exemplary embodiment of a system 100 implementing the principles of the invention is shown in FIG. 1. The system 100 includes an input/output (I/O) control hub 110 which is coupled to a memory control hub 120 and a cache controller 130. The memory control hub 120 is coupled to a processor 140 and a main memory 150. The cache controller 130 is coupled to a storage cache memory (hereinafter "cache") 160 and a mass storage device 170. Finally, a number of input/output devices 180 such as a keyboard, mouse and/or display can also be coupled to the I/O control hub 110.

In the system 100, the memory control hub 120 and the I/O control hub 110 may be implemented in a chipset. The main memory 150 may comprise of a random-access-memory (RAM). The mass storage device 170 may be, for example, a magnetic or optical memory device, for mass storage (or saving) of information. Also, in one embodiment, the cache memory 160 is a non-volatile memory such as a polymer ferroelectric RAM (PFRAM). The cache controller 130 including a least recently used (LRU) logic 135 controls the operation of the cache 160, such as the metadata updates and cache de-allocation/replacement.

Although the system 100 is shown as system with a single processor, the invention may be implemented with multiple processors. In such case, each additional processor would share the cache 160 and main memory 100 for writing data and/or instructions to and reading data and/or instructions from the same. Similarly, the invention may be implemented with multiple mass storage devices, each having a cache or sharing a cache. Moreover, in an alternative embodiment of the system 100, the cache may be controlled by a driver and executed on the processor through the I/O control hub 110. The driver may be stored in the main memory 150 and may access data from the mass storage 170. When appropriate, the driver stores the accessed data in the cache 160. In such case, the cache controller 130 can be omitted and the LRU logic would be an algorithm in the driver. Also, the cache 160 and mass storage 170 would be directly coupled to the I/O control hub 110.

In addition, an external clock may be coupled to the system 100, based on which the processor 140 controls the operation of the cache controller 130. In one embodiment, the clock may be implemented as an internal clock, either by hardware or software, within the cache controller 130. The invention will next be described below.

Figure 2:
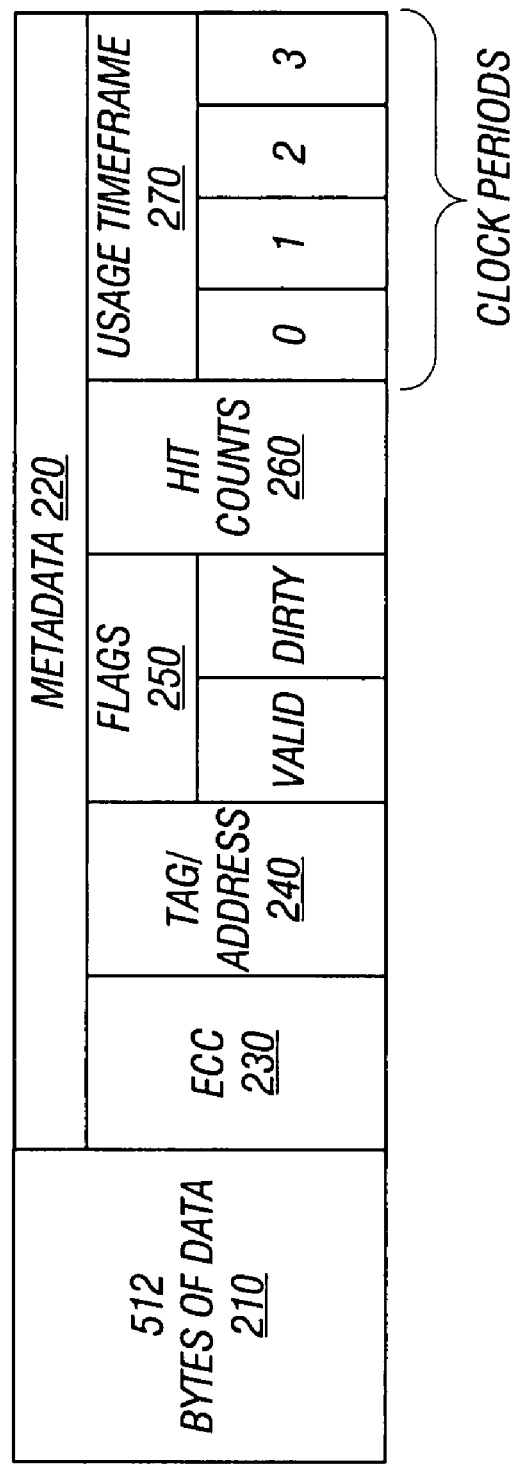
FIG. 2 is an exemplary cache line layout in accordance to one embodiment of the invention.

FIG. 2 shows an example cache line layout for 512 bytes of data 210 with metadata 220. The metadata 220 may include, as shown, an error correction code (ECC) 230 to recover the data 210, a tag or address 240 to indicate the data to which the metadata corresponds, and flags 250 to indicate if the cache line is valid and/or dirty. The metadata 220 also may include a hit count 260 and the usage timeframe indicator 270, used to implement the invention.

The hit count 260 is updated when the cache line is read or written and the tag/address is unchanged. The hit count 260 can be updated by incrementing the hit count using a hit counter. In one embodiment, the hit counter increments (decrements) until a maximum (minimum) value is reached. For instance, 4-bit counter having a maximum value of 15 would remain at 15 once this maximum value is reached.

The usage timeframe information 270 approximates the usage information such as the LRU information used in deciding the de-allocation/replacement of the data in the cache. To implement true least recently used indications in hardware is time consuming and space intensive in software. Therefore, an approximation is developed that can easily be implemented in hardware. Namely, a clock having N periods is utilized. Each clock period is fairly long and the exact value is something that should be tuned to the workload being cached. For very large caches, the clock "tick" (the time taken by the clock to pass from one period to the next) can be in hours or even tens of hours. The clock cycle resets after the $N^{th}$ period.

For example, the cache line layout in FIG. 2 shows a usage timeframe 270 for N=4. In such case, four usage bits are allocated to represent the usage timeframe information 270, each corresponding to one of the clock periods 0-3. The clock period would reset to 0 after the $3^{rd}$ period and the clock output would be 0,1,2,3,0,1,2,3 . . . .

Figure 3:
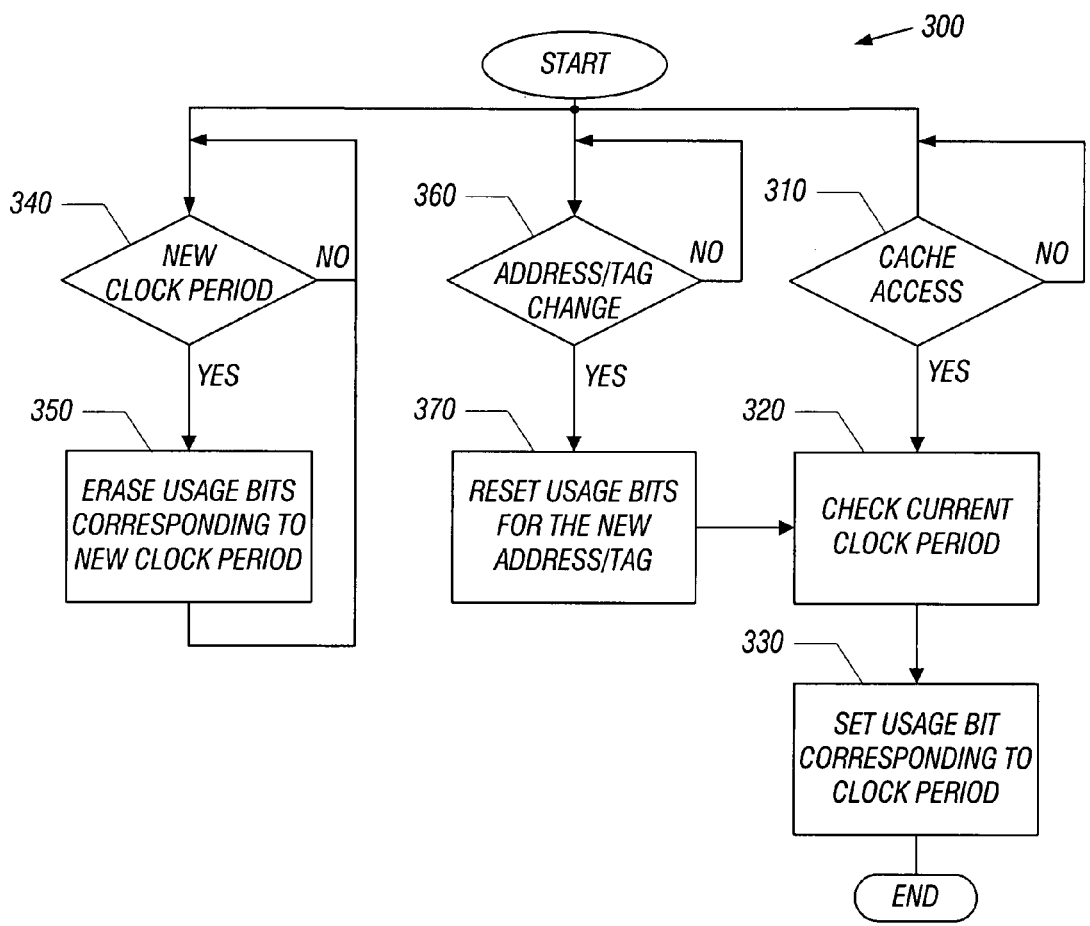
FIG. 3 is an exemplary block diagram of one embodiment of the invention.

FIG. 3 shows an exemplary embodiment of a procedure 300 to update the usage timeframe information in accordance with the invention. When a cache line is accessed (block 310) for either a read or a write, the current clock period of the clock 180 is checked (block 320). The usage bit corresponding to the current clock period is then set (block 330). If the usage bit has already been set, it remains set. In one embodiment, if the cache line is accessed just to read the metadata, the usage bit is not changed.

For example, in the usage timeframe information 270 of FIG. 2, if the clock period is 0 when cache line is accessed, the period 0 usage bit is set. If the period 0 usage bit is already set, then it remains set. If the period is 4, the usage bit corresponding to period 4 is set.

Also, in one embodiment of the procedure described above, the usage bit is set or written during the writeback cycle. During a writeback cycle, data read from a memory is rewritten back because the data is destroyed in the reading process. Examples of memories with a writeback cycle (hereinafter "destructive read" memory) includes, but is not limited to, a memory with a destructive read cycle such as the PFRAM, a Magnetic RAM (MRAM) and a core memory. Accordingly, if a destructive read memory is used as the cache memory 160, metadata information including the usage bit is updated using the writeback cycle.

Referring back to FIG. 3, when a new clock period begins (block 340), the usage bits corresponding to the new clock period are erased (block 350). Thus, when a clock ticks from one period to the next, all of the usage bits for that time period are erased. For a destructive read cache memory, the usage bits can be erased, for example, by reading them. Also, in one embodiment, the feature of the memory array is used to erase the group of bits at once.

Also, if an address/tag 240 in the metadata is changed, a new cache line corresponding to a new address is generated. Thus, when a tag address is changed (block 360), the usage bits for the new address are reset (block 370). Thereafter, the current clock period is check and the usage bit for the current period is set (blocks 320 and 330).

The result is that for every cache line, there is an accurate representation of whether or not that cache line has been accessed in the last N number of periods. In FIG. 2, for example, if the current clock period is 3 while the usage bits for periods 0, 1, 2 and 3 are all set, the cache line has been used in each of the previous 3 and current clock period. Therefore, this cache line is likely a poor candidate for replacement. However, a cache line with none of the usage bits set, meaning no accesses during the last 3 plus current time period, is likely a good candidate for replacement. In another example, a cache line with only the usage bit corresponding to the oldest periods being set indicates that it's been a long time since the cache line has been accessed. Such cache line might also be an attractive replacement candidate.

Accordingly, the invention allows reliable data on which to base allocation or replacement and other decisions requiring the hit count and/or LRU information. For example, when a cache storage is considered full, decisions to de-allocate/replace data in the cache can be made based on both the hit count and the usage timeframe or based solely on the usage timeframe. By using the usage timeframe to decide what to de-allocate/replace when a cache is full, neither a software LRU list nor the hit count needs to be maintained. This raises the performance as fewer instructions need to be executed. Also, by using a nonvolatile memory such as the PFRAM, costs are significantly reduced as list and counter in software use Dynamic Random Access Memory (DRAM) space, which is more expensive than a non-volatile memory.

Moreover, in a destructive read memory, the hit count and usage timeframe information can be automatically updated without software intervention, although the results are reported to software. Also, the updates can be performed without any performance overhead as a writeback cycle is required and simple updates of the metadata, including the usage bits, can be written during the writeback cycle. Therefore, the data required for de-allocation/replacement decisions can be provided without requiring any extra accesses to the memory array since the updates are accomplished in the writeback cycle.

While the invention has been described with reference to a cache memory, the teachings of the invention can be applied to any types of memory with metadata. Also, the invention has been described with reference to metadata indicating the usage information such as the least recently used information, the invention can be applied to other types of metadata. For example, the writeback cycle can be used to update any metadata information for a destructive read memory, either volatile or non-volatile. Therefore, the foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method comprising:
checking a current clock period when a memory is accessed, the current clock period being one of a given number of clock periods;

setting a usage bit corresponding to the current clock period during a writeback cycle to write data read from the memory back to the memory, the usage bit indicating usage information for the data, resetting usage bits in response to changing an address or tag for the memory; and setting a usage bit corresponding to a current clock period, wherein the memory is non-volatile destructive read cache memory.

2. The method of claim 1, comprising:

erasing usage bits corresponding to a new clock period.

3. The method of claim 2, wherein erasing includes erasing usage bits at once.

4. The method of claim 1, wherein the given number of clock periods is four.

5. The method of claim 1, wherein the memory is one of a polymer ferroelectric RAM, a magnetic RAM or a core memory.

6. The method of claim 1, comprising:

de-allocating data in the memory based upon usage bits.

7. A method comprising:

storing usage bits to indicate usage information for entries in a memory, a usage bit to indicate whether a corresponding entry was accessed during a corresponding one of a predetermined number of clock periods;

updating a usage bit for an entry read from the memory during a writeback cycle to write the read entry back to the memory by checking a current clock period when the memory is accessed, the current clock period being one of a predetermined number of clock periods, and setting a usage bit corresponding to the current clock period;

resetting usage bits when an address or tag for an entry is changed; and setting a usage bit corresponding to a current clock period, wherein the memory is non-volatile destructive read cache memory.

8. The method of claim 7, wherein the usage information is a least recently used information.

9. The method of claim 7, comprising:

erasing usage bits corresponding to a new clock period.

10. The method of claim 7, wherein the predetermined number of clock periods is four.

11. The method of claim 7, wherein the memory comprises polymer ferroelectric memory, magnetic random access memory (MRAM), or core memory.

12. A machine readable medium having executable instructions comprising:

a first group of executable instructions to check a current clock period when a memory is accessed, the current clock period being one of a predetermined number of clock periods;

a second group of executable instructions to set a usage bit corresponding to the current clock period during a writeback cycle to write data read from the memory back to the memory, the usage bit indicating usage information for the data; and a third group of executable instructions to reset usage bits in response to changing an address or tag for the memory, and to set a usage bit corresponding to a current clock period, wherein the memory is non-volatile destructive read cache memory.

13. The medium of claim 12, comprising:

a third group of executable instructions to erase usage bits corresponding to a new clock period.

14. The medium of claim 7, wherein the memory comprises polymer ferroelectric memory, magnetic random access memory (MRAM), or core memory.

* * * * *